(12) United States Patent
Fournier (10) Patent No.: US 7,738,861 B2
(45) Date of Patent: Jun. 15, 2010

(54) CALLER IDENTIFICATION USING PUSH-TO-TALK PROTOCOL FOR WIRELESS COMMUNICATIONS DEVICES

(75) Inventor: Gwendolyn Fournier, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1002 days.

(21) Appl. No.: 10/879,410

(22) Filed: Jun. 29, 2004

(65) Prior Publication Data

US 2005/0287997 A1 Dec. 29, 2005

(51) Int. Cl.
H04M 3/42 (2006.01)

(52) U.S. Cl. .................. 455/415; 455/517; 455/518; 455/414.1; 379/142.01; 379/142.06; 379/142.07; 370/260; 370/390; 370/432

(58) Field of Classification Search .......... 455/466, 455/415, 426.2, 413, 414.1, 517–520; 370/260, 370/390; 379/142.14, 93.17, 142.01–142.07, 379/207.15
See application file for complete search history.

(56) References Cited

U.S. PATENT DOCUMENTS

| 7,170,863 | B1 * | 1/2007 | Denman et al. ............. 370/260 |
| 2002/0059527 | A1 * | 5/2002 | Pedersen et al. ............ 713/201 |
| 2002/0067812 | A1 * | 6/2002 | Fellingham et al. ...... 379/93.25 |
| 2002/0172338 | A1 * | 11/2002 | Lee et al. ............... 379/142.01 |
| 2003/0007616 | A1 * | 1/2003 | Alves et al. ............. 379/142.14 |
| 2003/0012149 | A1 * | 1/2003 | Maggenti et al. ............. 370/260 |
| 2003/0133553 | A1 * | 7/2003 | Khakoo et al. .......... 379/142.01 |
| 2004/0076139 | A1 * | 4/2004 | Kang-Yeh et al. ............ 370/349 |
| 2004/0266426 | A1 * | 12/2004 | Marsh et al. .............. 455/426.2 |
| 2005/0101303 | A1 * | 5/2005 | Pelaez et al. ................. 455/413 |
| 2005/0105705 | A1 * | 5/2005 | Elcock et al. ........... 379/142.01 |
| 2005/0143135 | A1 * | 6/2005 | Brems et al. ................. 455/564 |
| 2005/0197101 | A1 * | 9/2005 | Gupta ......................... 455/410 |

FOREIGN PATENT DOCUMENTS

WO    WO 02/091717    11/2002

OTHER PUBLICATIONS

PCT International Search Report dated Apr. 22, 2005; International Application No. PCT/US2004/043467 filed Dec. 22, 2004.
"Sprint Introduces Sanyo's VM4500 Video Phone with PPT" Internet article from Mobile Tech News located at: http://www.nobiletechnews.com/info/2003/12/05/010340.html (15 pages).

* cited by examiner

Primary Examiner—Charles N Appiah
Assistant Examiner—Michael T Vu
(74) Attorney, Agent, or Firm—Coats & Bennett, P.L.L.C.

(57) ABSTRACT

A calling party's mobile terminal includes a push-to-talk (PTT) actuator, a transceiver operable to communicate in a half-duplex mode, and a controller. SIP signaling messages sent by the calling party include information associated with one or more customized caller IDs of the calling party. The caller IDs are customized, stored, and managed by the calling party. A remote party's mobile terminal receives the SIP signaling messages, and outputs the calling party's customized caller ID to the remote party to identify the calling party.

20 Claims, 8 Drawing Sheets

| Contact | Caller ID |
|---|---|
| Mom | my ID_1 |
| Dad | my ID_1 |
| Engineering | www.pictureserver.com\myPic.jpg |
| ⋮ | |
| Default | my Default ID |

CALLER IDENTIFICATION USING PUSH-TO-TALK PROTOCOL FOR WIRELESS COMMUNICATIONS DEVICES

BACKGROUND

The present invention relates generally to wireless communications devices, and particularly wireless communications devices capable of push-to-talk functionality.

Push-To-Talk (PTT) functionality allows point-to-multipoint communications between users. Transmissions are usually half-duplex, and require a user to press and hold a button on the wireless communications device while speaking into a microphone. PTT is a functionality that is most often associated with private radio systems. However, recent efforts have led to a set of standards that will permit PTT functionality over packet-switched networks. This set of standards is known as the Push-To-Talk over Cellular (PoC) standards, and employs Session Initiation Protocol (SIP) for signaling.

One type of functionality associated with communications systems is caller identification (e.g., caller ID). This permits a recipient of a cellular telephone call, for example, to know whom the calling party is before answering the call. However, existing methods of identifying calling parties are configured to use information stored on an entity in the network or on the recipient's phone. For example, some conventional methods will identify a calling party only if the calling party appears in the recipient's contact list or address book. This method does not allow a recipient to identify unknown parties, nor does it permit the recipient to identify known parties calling from unknown numbers. Further, conventional caller ID functionality does not permit the calling party to customize identification messages sent to the recipient. Rather, recipients receive only a name and/or telephone number associated with the calling party. What is needed is a method that permits calling parties to customize the appearance of a caller ID, and configure its presentation to a recipient.

SUMMARY

The present invention provides a system and method that permits users to create, store, and manage customized caller ID files. The caller ID files may be, for example, audio files, video files, text, or image files, and may be associated with one or more intended recipients in the user's address book. When the user, as a calling party, calls an intended recipient, the customized caller ID files may be included in the signaling message during call set up. A server in a core network forwards the signaling message and the customized caller ID files to the recipient via a Base Station System (BSS). When the recipient receives the signaling message, the recipient's communication device displays and/or renders the customized caller ID files over the device's display and/or speaker. This permits the recipient to identify the calling party before accepting or declining an invitation to converse with the calling party.

Alternatively, the user may include a Uniform Resource Locator (URL) in the signaling message that identifies the location of the customized caller ID files accessible to the server and/or recipient. In this embodiment, the server might include the files identified by the URL in the signaling message before forwarding the signaling message to the recipient. Upon receipt, the recipient's device displays and/or renders the files for the recipient. In an alternate embodiment, the server simply forwards the signaling message including the URL to the recipient's device. In this latter case, the recipient's device will use the received URL to access the customized caller ID files, and display and/or render the caller ID files for the recipient. The recipient may then choose to accept the invitation to communicate based on the identity of the calling party.

DETAILED DESCRIPTION

Figure 1:
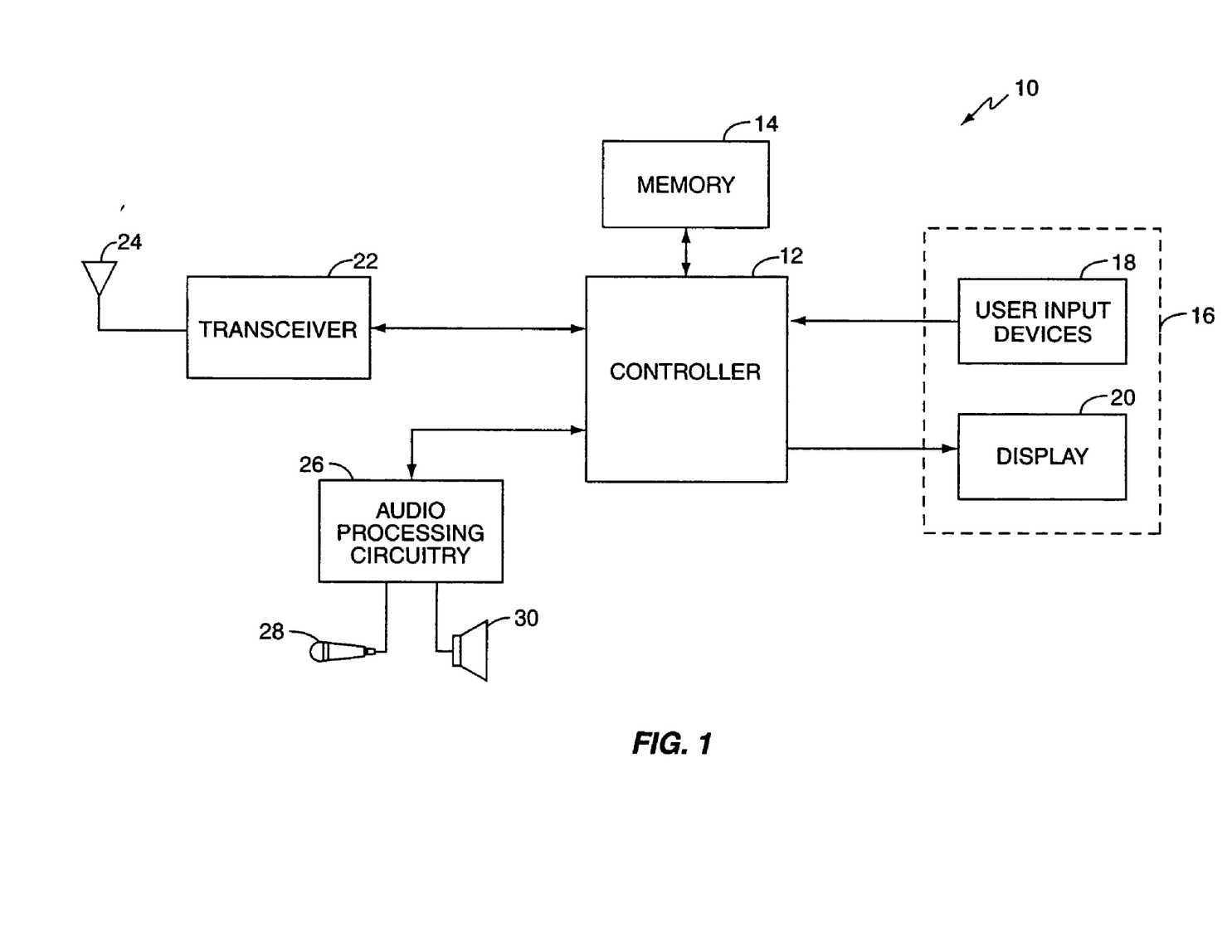
FIG. 1 illustrates a block diagram of an exemplary wireless communications device.
Figure 2:
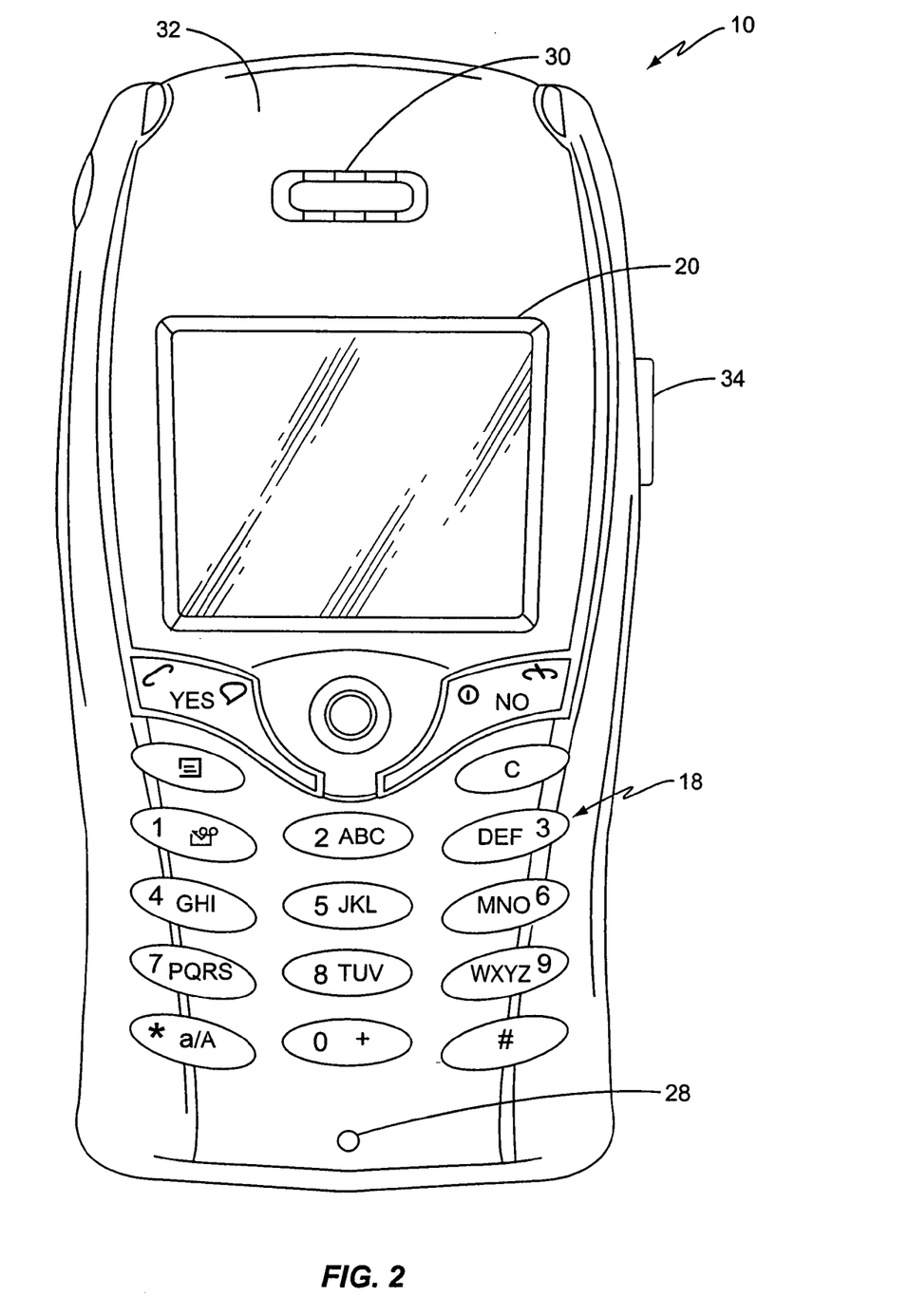
FIG. 2 illustrates a perspective view of a wireless communications device equipped for PTT services.

FIGS. 1 and 2 illustrate an exemplary embodiment of a wireless communications device configured according to the present invention. The device of FIG. 1 represents a mobile terminal 10. In one embodiment, mobile terminal 10 is a cellular telephone equipped for PTT functionality. However, the present invention is not limited solely to use in PTT enabled cellular phones, but may be embodied in other wireless communication devices such as, satellite telephones, personal communication services (PCS) devices, personal data assistants (PDAs), palm-top computers, and other devices not specifically mentioned herein that permit push-to-talk communications with a remote party.

Mobile terminal 10 comprises one or more controllers 12, memory 14, a user interface 16, a wireless transceiver 22 having an antenna 24, audio processing circuitry 26, a microphone 28, and a speaker 30 contained within a housing 32. Controller 12 performs various processing tasks including controlling the overall operation of mobile terminal 10 according to programs stored in memory 14. Additionally, controller 12 may perform various audio and/or image processing as needed or desired. Controller 12 may be implemented in hardware, firmware, software, or any combination thereof. Controller 12 may comprise a single microprocessor or multiple microprocessors, and may include general-purpose microprocessors, digital signal processors, or other special purpose processors.

Memory 14 represents the entire hierarchy of memory in mobile terminal 10, and may include both random access memory (RAM) and read-only memory (ROM). Program instructions and data required for operation of mobile terminal 10 are stored in non-volatile memory, such as EPROM, EEPROM, and/or flash memory. Memory 14 may be implemented as one or more discrete devices, stacked devices, or integrated with controller 12. As will be described in more detail below, a user of mobile terminal 10 may store data associated with one or more customized caller IDs in memory 14.

The user interface 16 includes one or more user input devices 18 and at least one display 20. User interface 16 enables the user to interact with and control mobile terminal 10. The user input devices 18 may include a keypad, touchpad, joystick control dials, control buttons, or any combination thereof. An exemplary user interface, illustrated in FIG. 2, includes an alphanumeric keypad and a joystick control as is well known in the art. Keypad and joystick control allow the operator to dial numbers, enter commands, scroll through menus and menu items presented to the user on display 20, and make selections. For example, users of mobile terminal 10 may use the keypad and/or the joystick to select desired caller IDs and/or users to communicate with, as described in more detail below. Display 20 allows the operator to view information such as menus and menu items, dialed digits, images, call status information, and output from user applications. On a recipient's mobile terminal, display 20 may display the contents of the customized caller ID transmitted from the calling party during call set up.

Transceiver 22 is coupled to antenna 24 for receiving and transmitting signals from and to a wireless communications network. Transceiver 22 is a fully functional cellular radio transceiver, which may operate according to any known standard, including the standards known generally as the Global System for Mobile Communications (GSM), TIA/EIA-136, cdmaOne, cdma2000, UMTS, and Wideband CDMA. Transceiver 22 preferably includes baseband-processing circuits to process signals transmitted and received by the transceiver 22. Alternatively, the baseband-processing circuits may be incorporated in the controller 12. As discussed below in more detail, transceiver 22 may transmit and receive SIP signaling messages to and from the wireless communications network.

Audio processing circuitry 26 receives analog audio inputs from microphone 28, and provides basic analog output signals to speaker 30. Microphone 28 converts the detected speech and other audible signals into electrical audio signals and speaker 30 converts analog audio signals into audible signals that can be heard by the user. Audio processing circuitry 26 may be integrated with controller 12, or may be embodied as circuitry separate from controller 12.

FIG. 2 illustrates the physical appearance of an exemplary wireless communications mobile terminal 10. Mobile terminal 10 includes a housing 32 containing the user input device 18, display 20, microphone 28, and speaker 30. The keypad and joystick control serve as user input devices 18, and are disposed on a face of housing 32. A PTT actuator 34, which in FIG. 2 is a button, is disposed on a side of mobile terminal 10. A user wishing to communicate in a PTT (i.e., half-duplex) mode simply depresses actuator 34 and speaks into microphone 28. When the user is finished transmitting, the user releases actuator 34.

Figure 3:
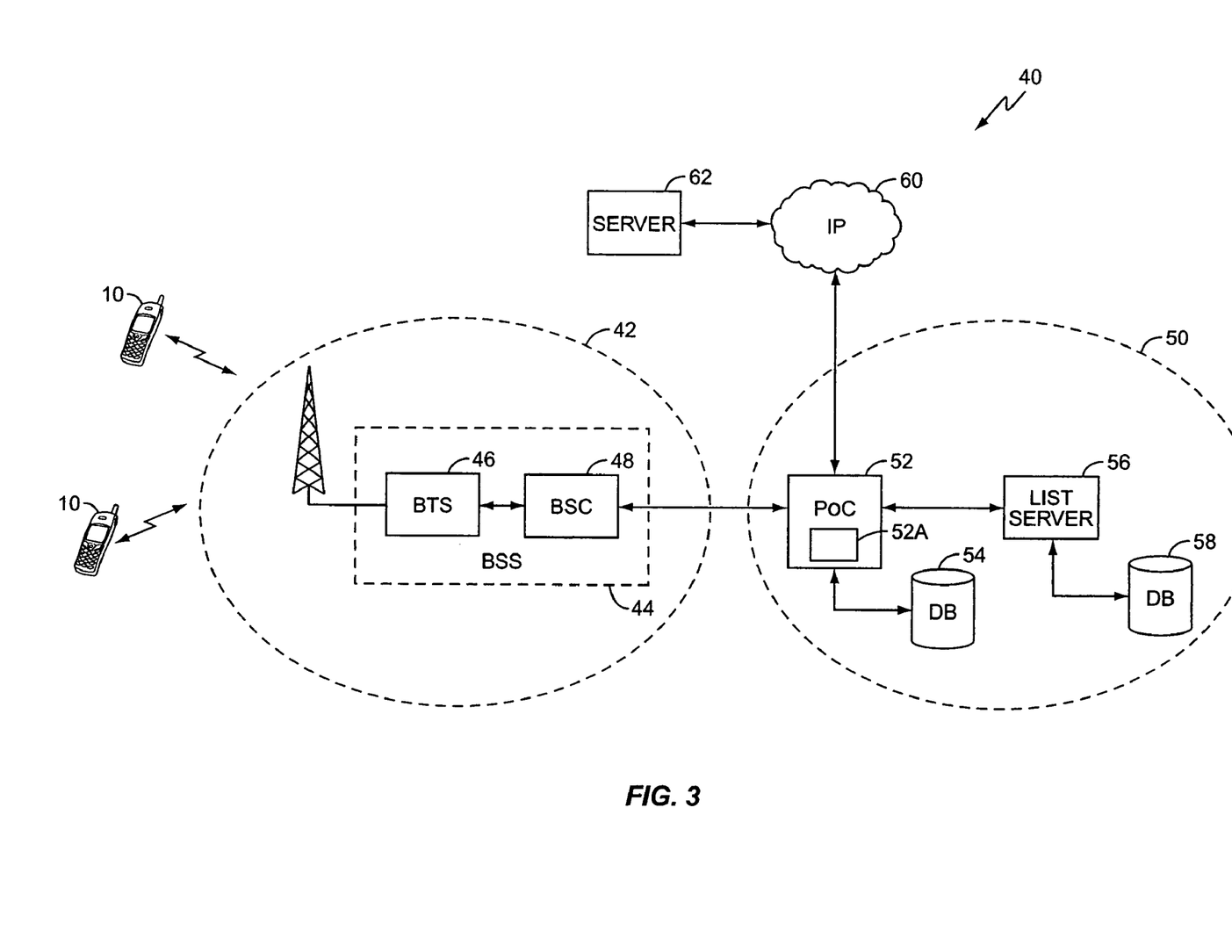
FIG. 3 illustrates a block diagram of a possible communications network configured to operate according to one embodiment of the present invention.

As previously stated, PoC is the set of standards that defines PTT functionality over cellular networks, and is intended for use over a packet switched network. This includes packet switched networks such as GSM, GPRS, and EGPRS. Thus, the present invention may also be employed over these networks. However, the present invention is not limited to these networks, and may be used over UTMS and CDMA packet switched networks as well. FIG. 3 illustrates a typical arrangement of a communications system 40 suitable for use with the present invention. System 40 comprises a packet switched radio network 42 to communicate with mobile terminals 10, a core network 50, and optionally, a server 62 connected to an IP network 60.

Packet switched network 42 comprises a Base Station Subsystem (BSS) 44 having one or more Base Transceiver Stations (BTS) 46, and a Base Station Controller (BSC) 48. Base Transceiver Stations (BTS) 46 provides an interface between mobile terminals 10 and the network 42. The BTS 46 contains radio transmission and reception equipment, up to and including the antennas, and includes the signal processing specific to the radio interface. The BSC 48 connects the BTS 46 with the core network 50, and performs most of the management and control functions of the BSS 44, for example, resource allocation and handover management. Those skilled in the art will appreciate that BSC 48 may also connect to other components not explicitly shown in the figures, such as a Serving GPRS Support Node (SGSN), a Gateway GPRS Support Node (GGSN), a Home Location Register (HLR), a Serving Mobile Location Center (SMLC), a Gateway Mobile Location Center (GMLC), and optionally, a Location Measuring Unit (LMU).

Core network 50 communicates with BSC 48, and comprises a PoC server 52 having a database 54, and a list server 56 having a database 56. Core network 50 provides IP connectivity to mobile terminals 10, and provides authentication and authorization services to mobile terminals 10. Core network 50 also routes SIP signaling messages, for example call set-up messages, between mobile terminals 10 and PoC server 52. While not specifically shown, network 50 may include one or more proxy servers, for example, SIP proxies and/or SIP registrars, to route the SIP signaling messages between mobile terminals 10 and PoC server 52.

PoC server 52 may comprise any server known in the art, for example, a computer running the UNIX operating system. PoC server 52 includes a controller 52a, and communicates with mobile terminals 10 via network 42 using a SIP interface, and provides users of mobile terminals 10 with functionality such as SIP session handling, policy control, group session handling, access control, and billing. As will be described in more detail below, controller 52a of PoC server 52 may also perform functionality that permits calling parties to identify themselves to one or more selected called parties during the set up of a call. This includes permitting a user of mobile terminal 10 to create, store, retrieve, and manage the data used to identify the user to the recipient during call set up. In one embodiment, this data may be stored in a database 54 connected to PoC server 52. As those skilled in the art will understand, database 54 may or may not be co-located with PoC server 52, or may be integrated with PoC server 52.

List server 56, like PoC server 52, may be any server known in the art. List server 56 permits the users of mobile terminal 10 to create, store, and manage lists that contain, for example, the identities of one or more users. Software running on list server 56 and/or mobile terminal 10 permits the user of mobile terminal 10 to select individuals or groups of individuals from these lists, to initiate call sessions, group call sessions, or chat sessions as desired. The lists may be stored on database 58, which may or may not be co-located with list server 56, or may be integrated with list server 56.

Server 62 may be, for example, a web server or other external server connected to the core network 50 via an IP network 60. The IP network 60 may be a public network, such as the Internet, or may be a privately owned network. In either case, mobile terminals 10 may access server 62 via core network 50. The PoC server 52 in FIG. 3 provides a connection between core network 50 and server 62. However, those skilled in the art will appreciate that other components, for example, gateway servers (not shown), are suitable for providing the connection between core network 50 and server 62. In one embodiment of the present invention, a user of mobile terminal 10 may create, store, retrieve, and manage the data on server 62, and use that data to identify themselves to the recipient.

Figure 4:
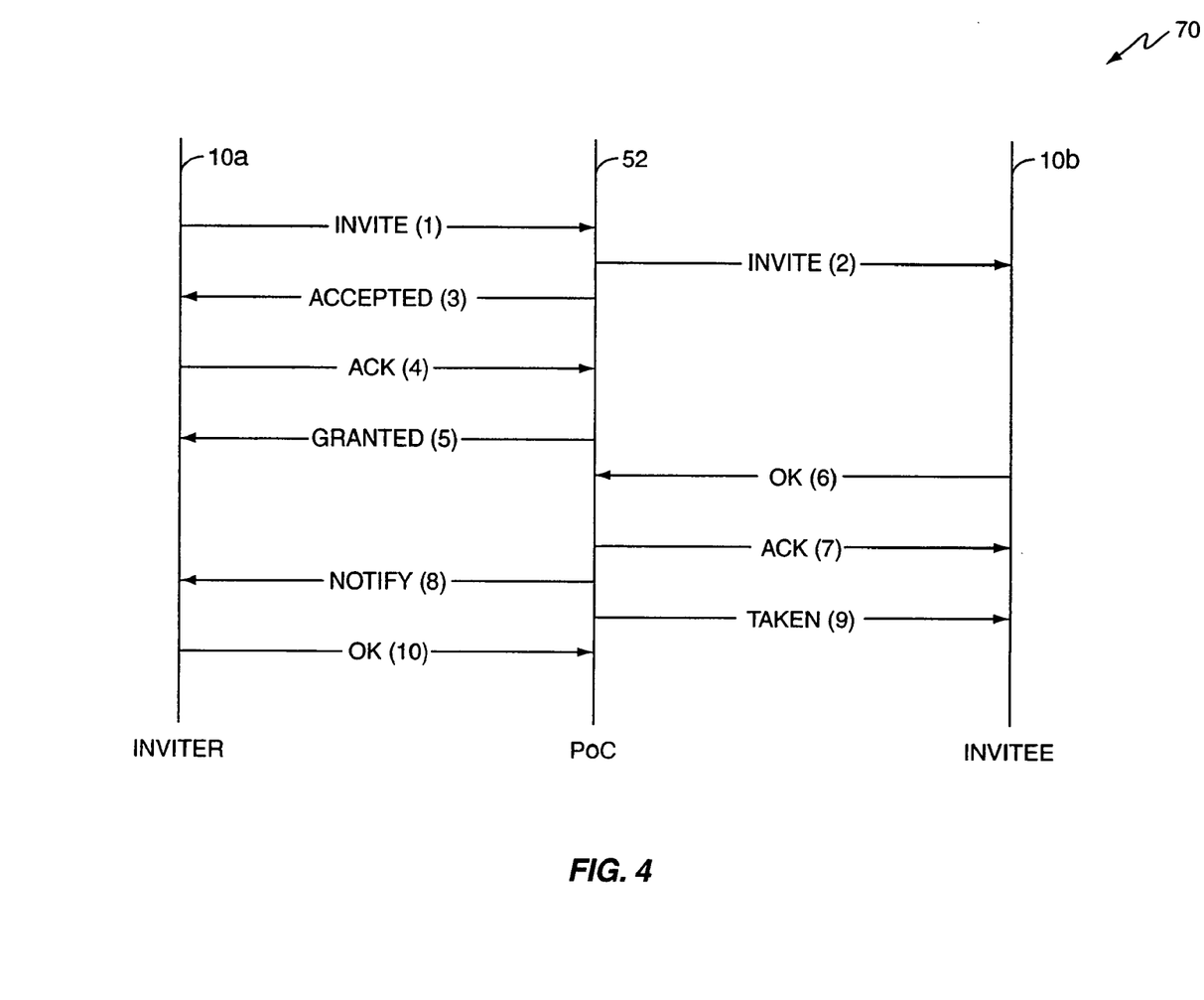
FIG. 4 illustrates a possible signaling flow used in call setup.

PoC services are based primarily on established Internet protocols, such as TCP/IP or UDP, and require the use of the SIP signaling messages between the mobile terminals 10 and PoC server 52. For example, a SIP INVITE message may be used to set up a PoC call between a calling party and a recipient. FIG. 4 illustrates one possible SIP signaling flow 70 that may be used to set up such a call between the calling party 10a and the recipient 10b via PoC server 52.

The signaling flow 70 begins when calling party 10a actuates the PTT button 34 on his or her mobile terminal 10. This causes controller 12 to generate and transmit a SIP INVITE message to PoC server 52 via transceiver 22. PoC server 52 forwards the SIP INVITE message to the recipient 10b, and returns a SIP ACCEPTED message to the calling party 10a. The mobile terminal 10 of the calling party 10a then responds with a SIP ACKNOWLEDGE message to PoC server 52, which in turn responds with a SIP GRANTED message. Because PoC communications are half-duplex, only one user at a time may have the "floor" to speak. This is known in the art as floor control. The SIP GRANTED message ensures that only one user is granted the "floor" at a time.

If the recipient 10b accepts the SIP INVITE message from calling party 10a, the mobile terminal 10 of the recipient 10b transmits a SIP OK message to PoC server 52. PoC server 52 responds by sending a SIP ACKNOWLEDGE message to the recipient 10b, and a SIP NOTIFY message to notify calling party 10a that the call has been accepted. PoC server 52 then sends a SIP TAKEN message to notify the recipient 10b that calling party 10a has the "floor" to speak. Calling party 10a sends a SIP OK message to PoC server 52, and communications may begin between the parties. As the communications ensue, the PoC server 52 will send appropriate SIP signaling messages to alternate the floor grant between the parties.

As stated above, conventional caller identification services do not permit a calling party to customize the identification data sent to recipients, nor does it permit the calling party to control the presentation of the caller ID information to a recipient. Rather, conventional methods merely send a name and/or a telephone number retrieved from a component in the network or the recipient's device. The present invention permits the calling party to create, store, retrieve, and manage information associated with one or more customized caller IDs, and send selected customized caller IDs to one or more recipients via the PoC server 52.

The customized caller IDs are created by the user of mobile terminal 10 using any method known in the art, and may comprise data such as user text, images, video, audio files, URLs, or any combination thereof. Alternatively, users may download these files from the Internet, for example, or other public or private network. The caller ID files may be stored in memory 14 on mobile terminal 10, database 54, or server 62, and are associated with one or more recipients by the user of mobile terminal 10.

Figure 5:
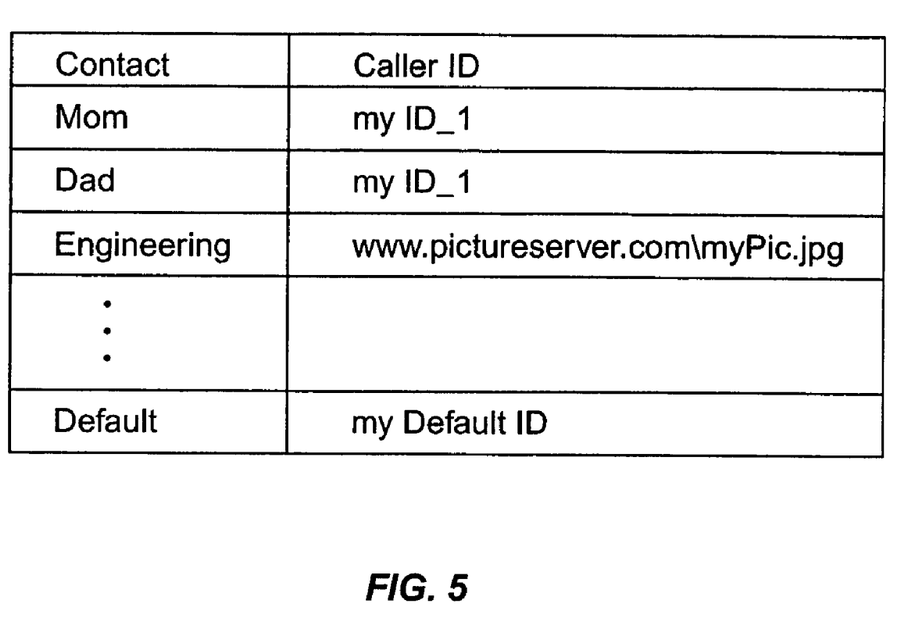
FIG. 5 illustrates one possible method of associating caller ID information with one or more called parties according to the present invention.

FIG. 5 illustrates one embodiment where the contacts stored in an address book are associated with customized caller ID information created by the calling party. In this example, the contacts "Mom" and "Dad" are associated with an index "myID_1" that identifies one or more caller ID files stored on mobile terminal 10. However, the index may alternatively identify one or more customized caller files that reside on an external or publicly accessible server 62, or database 54, 58 located in core network 50. Likewise, the contact "Engineering" group, which may include several contacts, is associated with a URL to an image file located on server 62. In FIG. 5, the URL appears as "www.pictureserver.com\myPic.jpg," however, those skilled in the art will appreciate that URL may assume various forms. Additionally, users may configure a default caller ID to send to any party not on the user's contacts list. As should be understood, other methods not specifically described herein may be employed to associate one or more recipients with one or more customized caller IDs.

The calling party may send a selected customized caller ID information to one or more recipients during the set up of a PoC call in a call setup message. As previously stated, the signaling message may a SIP signaling message, although other signaling messages may be used as well. This permits the recipients to identify the calling party before accepting the call. Either the files, or a location of the files may be sent. In one example, the actual caller ID files are stored on a network server to minimize memory use on mobile terminal 10 and to reduce the size of the signaling messages. Instead, the URL identifying the location of the customized caller ID files is sent to the recipient. In one embodiment, the CALL-ID field of a SIP INVITE message, for example, may be formatted according to the following format.

<number>@<host>.<domain>\\<caller_id_URL> where <number> represents the telephone number of the calling party, <host> and <domain> represent the host and domain of the calling party, and <caller_id_URL> represents the URL to the caller ID files.

Figure 6:
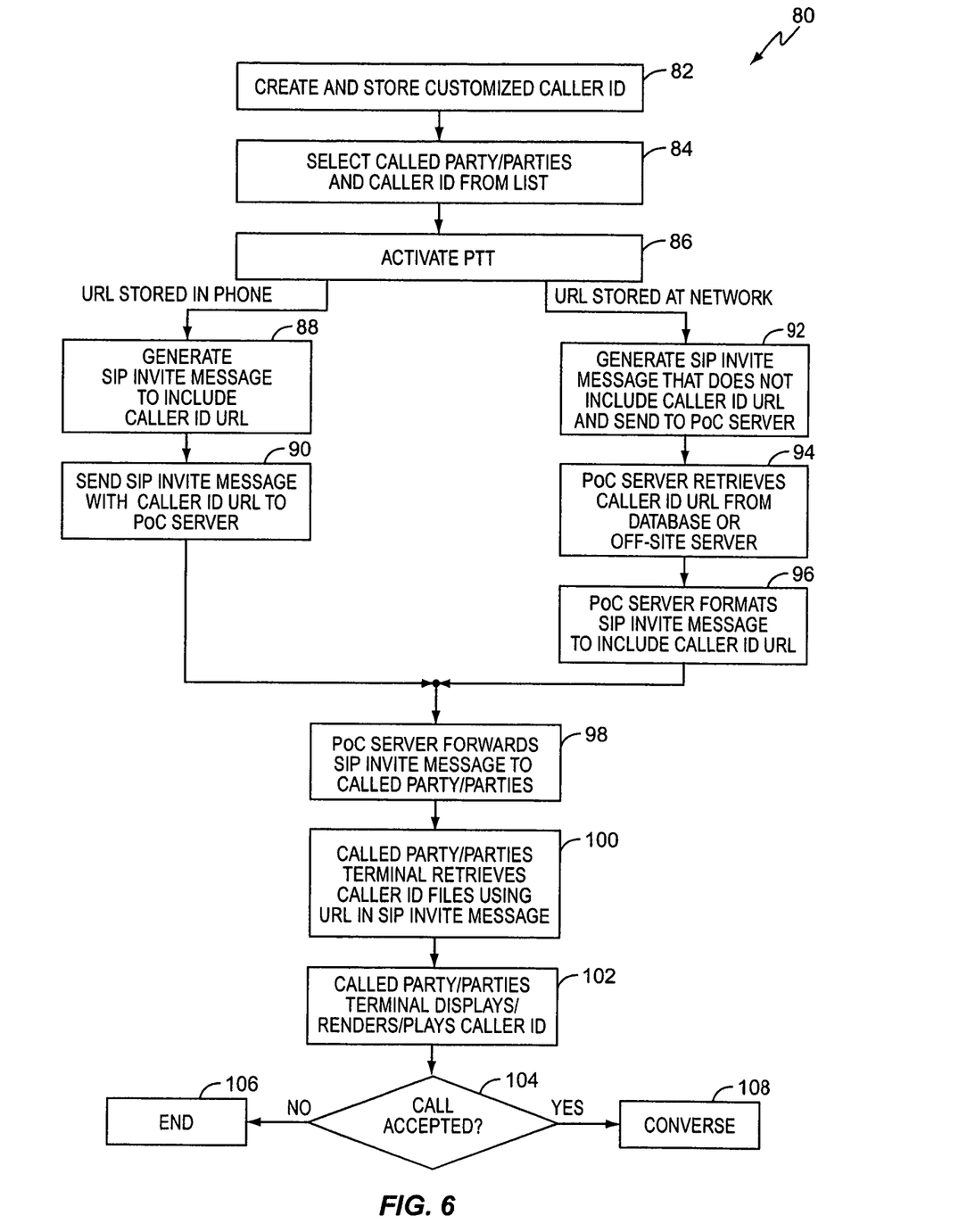
FIG. 6 illustrates embodiments showing how a calling party may send customized caller ID information to a recipient at the time of the call according to the present invention.

FIG. 6 illustrates a method 80 where the URL is sent to the recipient. First, the calling party must have created one or more customized caller ID files, stored them on server 62, and associated the URLs with one or more contacts in an address book (box 82). In one embodiment, the association is stored in memory 14 of mobile terminal 10. In an alternate embodiment, the association is stored in database 54 associated with PoC server 52. In another embodiment, the association is stored in list server 56. Depending upon where the associations are stored, the format of the SIP INVITE message transmitted by the calling party's mobile terminal 10 may vary.

To begin a PoC conversation, the calling party selects one or more intended recipients with which to hold a conversation. The URL associated with the selected recipients is also selected to include in the CALL-ID field of the SIP INVITE message (box 84). In this embodiment, controller 12 or PoC server 52 automatically selects the URL associated with the selected recipient. However, it should be understood that a calling party might manually select a URL. Alternatively, controller 12 or PoC server 52 might select the default URL for parties not included in the users contact list/address book. The calling party then actuates the PTT button 34 of mobile terminal 10 (box 86). This causes controller 12 to generate the SIP INVITE message to send to the PoC server 52.

In a first embodiment, the associations are stored in memory 14 at the mobile terminal 10. In this embodiment, the controller 12 retrieves the URL associated with the intended recipient from memory 14, and formats the SIP INVITE message to include the URL in the CALL-ID field (box 88). Controller 12 then transmits the formatted SIP INVITE message including the associated URL to the PoC server 52 (box 90).

In a second embodiment, the associations are stored in database 54. In this embodiment, the controller 12 generates and transmits the SIP INVITE message without the URL in the CALL-ID field to PoC server 52 (box 92). Once the PoC server 52 receives the SIP INVITE message from the calling party, PoC server 52 retrieves the associated URL based on the identity of the calling party and/or the identity of the recipient from database 54 (box 94). Retrieval of the URL by the PoC server 52 may be based on a SIP Uniform Resource Identifier (URI) in the SIP INVITE message. The SIP URI is an alphanumeric string used in addressing, and uniquely identifies a user. An example of a SIP URI is sip: john.doe@poc.operations.net. Alternatively, other identifiers, such as a private user identity (e.g., john.doe@poc.operations.net), may also be used. Once the URL is retrieved, PoC server 52 formats the SIP INVITE message to include the URL (box 96).

Regardless of how, or from where, the URL is retrieved, PoC server 52 forwards the SIP INVITE message including the URL to the recipient (box 98). The recipient's device then extracts the URL from the SIP INVITE message, and uses it to retrieve the actual caller ID files (box 100). For example, if the URL pointed to an audio file on server 62, the recipient's mobile terminal 10 would download the audio file from server 62 and render the audio file through speaker 30 (box 102). Likewise, if the URL pointed to video files, image files, or text, the recipient's mobile terminal 10 would download those files and display the data on display 20 (box 102). If the recipient accepts the call (box 104), the parties can converse (box 108). Otherwise, the call is eventually terminated, and the resources released (box 106).

FIG. 6 illustrated embodiments where a URL was sent as part of the SIP INVITE message. However, the present invention is not limited to sending only an associated URL in a SIP INVITE message. As seen in method 110 of FIG. 7, the actual caller ID files associated with the recipient or parties may be sent in addition to or in lieu of the URL if the protocol permits. For example, customized caller ID files may be carried in the "free text" portion of a SIP message. This may occur, for example, when the user sends an Instant Personal Alert Message to the recipient. In this embodiment, the user may insert one or more "tags" in the free text portion of the SIP message to designate the type of data carried in the message. The information following the tags could be one or more customized caller ID files.

Figure 7:
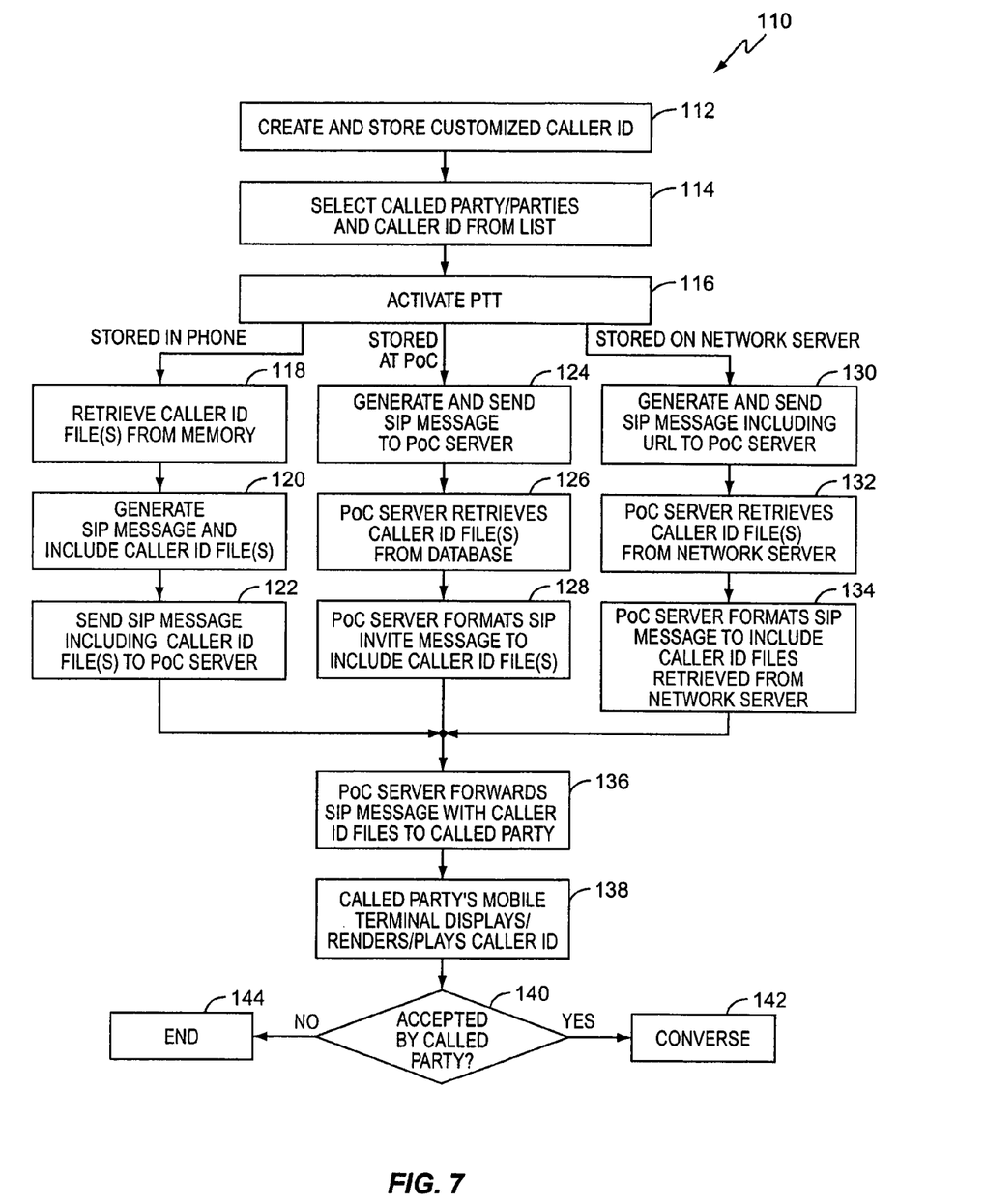
FIG. 7 illustrates alternate embodiments showing how a calling party may send customized caller ID information to a recipient at the time of the call according to the present invention.

In FIG. 7, the calling party creates the customized caller ID files (box 112), selects the recipient and associated caller ID information (box 114), and actuates the PTT button 34 of mobile terminal 10 (box 116) to cause controller 12 to generate a SIP signaling message to the PoC server 52. As above, the actual caller ID files may be stored in memory 14 of mobile terminal 10, database 54, or server 62.

If the customized caller ID files are stored on mobile phone 10, the controller 12 will retrieve the associated file or files from memory 14 (box 118), and embed the files in the generated signaling message (box 120). Controller 12 then sends the signaling message including the customized caller ID files to the PoC server 52 (box 122).

If the files are stored on database 54 at the PoC server, controller 12 generates the signaling message without the caller ID files and sends it to PoC server 52 (box 124). Upon receipt, PoC server 52 retrieves the customized caller ID files using, for example, the SIP URI and/or the private user identity as previously described (box 126). Once the files have been retrieved, the PoC server 52 formats the signaling message to carry the caller ID files (box 128).

If the caller ID files are stored on server 62, controller 12 may format the generated signaling message to PoC server 52 to include a URL to the files' location (box 130). Alternatively, the URL may also be pre-provisioned by the user and stored on PoC server 52. Regardless, PoC server 52 would retrieve the customized caller ID files identified by the URL (box 132), and format the signaling message to include the files (box 134).

Once PoC server 52 has formatted the signaling message, PoC server 52 forwards the message with the caller ID files to the recipient (box 136). Upon receipt, the recipient's device displays, renders, and or plays the customized caller ID files included in the signaling message (box 138). As in previous embodiments, if the call is accepted (box 140), conversation eventually ensues (box 142). Otherwise, the call may be terminated (box 144).

Figure 8:
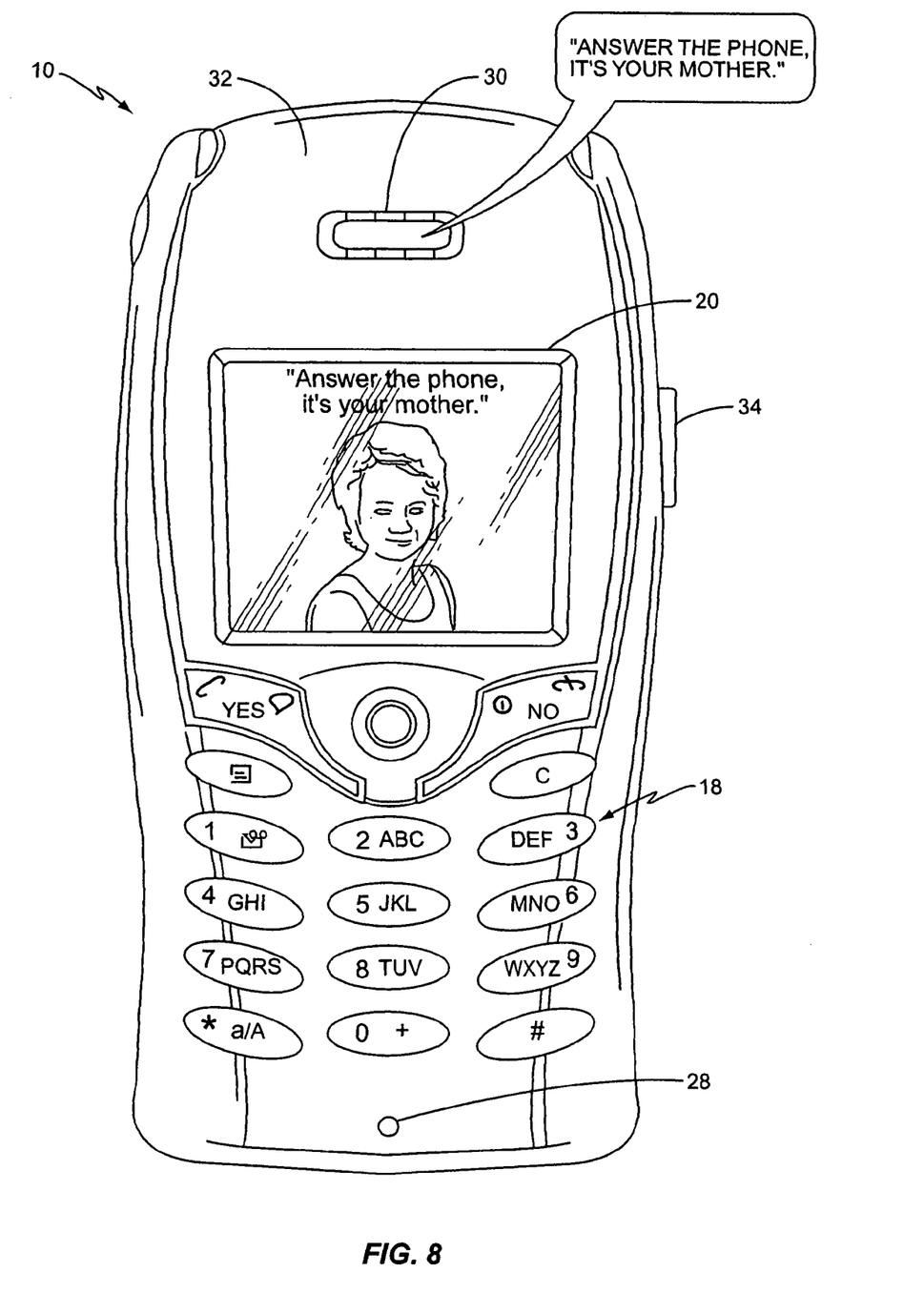
FIG. 8 illustrates a recipient's view of the customized caller ID according to one embodiment of the present invention.

FIG. 8 illustrates how the recipient might view a customized caller ID sent according to one embodiment of the present invention. As seen in FIG. 8, the caller ID sent with the signaling message to the recipient comprises an image of the calling party, as well as some text to be displayed on display 20. The caller ID also comprises an audio file that is rendered through speaker 30. Thus, the present invention is not limited to sending a customized caller ID relating to a single type of data. Rather, the customized caller IDs may provide the recipient with several types of information for display and or rendering.

It should be noted that the embodiments described herein specifically identify the SIP INVITE message as the signaling message that includes the caller ID information. However, it should be understood by those skilled in the art that other signaling messages might also be used to carry the information. For example, SIP NOTIFY messages may also be used.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile terminal comprising:
    a transceiver to transmit and receive signals in a half-duplex mode;
    a push-to-talk actuator to activate the transceiver in the half-duplex mode;
    memory configured to store:
        a plurality of Universal Resource Locators (URLs), each URL identifying a location of a different customized caller ID file stored on a remote server, and each customized caller ID file being customized by a user of the mobile terminal; and
        an address book including a plurality of personal contacts, each contact being assigned a selected one of the plurality of URLs; and
    a controller to generate a Session Initiation Protocol (SIP) signaling message to a selected contact from the address book, and to include the URL assigned to the contact in the SIP signaling message responsive to the actuation of the push-to-talk actuator.

2. The mobile terminal of claim 1 wherein the SIP signaling message comprises a SIP INVITE message.

3. The mobile terminal of claim 1 wherein the one or more customized caller ID files comprises an audio file.

4. The mobile terminal of claim 1 wherein the one or more customized caller ID files comprises an image file.

5. The mobile terminal of claim 1 wherein the one or more customized caller ID files comprises a video file.

6. The mobile terminal of claim 1 wherein the one or more customized caller ID files comprises a text file.

7. The mobile terminal of claim 1 wherein a first URL identifying the location of a first customized caller ID is assigned to a first contact.

8. The mobile terminal of claim 7 wherein a second URL identifying the location of a second customized caller ID is assigned to a second contact.

9. The mobile terminal of claim 8 wherein the second contact is a group comprising a plurality of contacts.

10. A communications system comprising:
    a base station system;
    a core network to communicate with the base station system; and
    a mobile terminal to:
        communicate with the base station system in a half-duplex mode;
        store a plurality of Universal Resource Locators (URLs) in memory, each URL identifying a location of a different customized caller ID file stored on a remote server, and each customized caller ID file being customized by a user of the mobile terminal;
        maintain an address book in the memory including a plurality of personal contacts, each contact being assigned a selected one of the plurality of URLs; and
        generate a Session Initiation Protocol (SIP) signaling message to a selected contact from the address book, the SIP message being generated to include the URL assigned to the selected contact; and
        transmit the SIP message including the assigned URL to the base station system responsive to a user actuating a push-to-talk (PTT) actuator on the mobile terminal.

11. The system of claim 10 wherein the base station system comprises a packet switched radio network.

12. The system of claim 10 wherein the core network comprises a first server to communicate the SIP signaling messages with the mobile terminal via the base station system.

13. The system of claim 12 wherein the first server includes a database to store the customized caller ID files.

14. The system of claim 12 wherein the core network further comprises a second server including a database communicatively connected to the first server to store the customized caller ID files.

15. The system of claim 12 further comprising an external server located in a publicly accessible network communicatively connected to the first server to store the customized caller ID files.

16. A method of identifying a calling party to a recipient comprising:
    storing a plurality of customized caller IDs at a remote server, each caller ID being customized by a calling party;
    storing an address book in memory of a mobile terminal capable of operating in a half-duplex mode, the address book comprising a plurality of contacts;
    assigning each contact a Universal Resource Locator (URL) identifying the location of a customized caller ID stored at the remote server;
    generating a Session Initiation Protocol (SIP) signaling message to a selected contact responsive to a user actuating a push-to-talk (PTT) actuator at the mobile terminal, the SIP message being generated to include the URL assigned to the selected contact; and
    transmitting the SIP signaling message from the calling party's mobile terminal to the recipient's mobile terminal responsive to the user actuating the PTT actuator.

17. The method of claim 16 further comprising the calling party assigning the URL to more than one contact in the address book.

18. The method of claim 16 wherein the customized caller IDs comprises one or more of an audio file, an image file, a video file, and a text file.

19. The method of claim 16 wherein generating the SIP signaling message comprises including selected information associated with the calling party's customized caller ID in the body of the SIP signaling message.

20. The method of claim 16 wherein the SIP signaling message comprises a SIP INVITE message.

* * * * *